(12) United States Patent
Crook

(10) Patent No.: US 8,301,645 B1
(45) Date of Patent: Oct. 30, 2012

(54) AGGREGATED WEB ANALYTICS REQUEST SYSTEMS AND METHODS

(75) Inventor: Lamont Allan Crook, Salt Lake City, UT (US)

(73) Assignee: Adobe Systems Incorporated, San Jose, CA (US)

( * ) Notice: Subject to any disclaimer, the term of this patent is extended or adjusted under 35 U.S.C. 154(b) by 244 days.

(21) Appl. No.: 12/869,422

(22) Filed: Aug. 26, 2010

(51) Int. Cl.
*G06F 17/30* (2006.01)

(52) U.S. Cl. ........ 707/755; 707/756; 707/803; 707/826; 709/219

(58) Field of Classification Search .................. 707/609, 707/736, 749, 750, 754, 755, 756, 802, 803, 707/826, 954; 705/3; 709/203, 211, 219, 709/236
See application file for complete search history.

(56) References Cited

U.S. PATENT DOCUMENTS

| | | | | |
|---|---|---|---|---|
| 4,270,174 | A * | 5/1981 | Karlin et al. ................... | 701/115 |
| 7,107,416 | B2 * | 9/2006 | Stuart et al. .................... | 711/159 |
| 8,073,707 | B2 * | 12/2011 | Teller et al. ........................ | 705/2 |
| 2006/0010150 | A1 * | 1/2006 | Shaath et al. .................. | 707/803 |
| 2006/0015536 | A1 * | 1/2006 | Buchanan et al. ............ | 707/609 |
| 2006/0031102 | A1 * | 2/2006 | Teller et al. ......................... | 705/3 |
| 2006/0264730 | A1 * | 11/2006 | Stivoric et al. ................ | 600/390 |
| 2007/0171470 | A1 * | 7/2007 | Fujii et al. ..................... | 358/1.15 |
| 2008/0263112 | A1 * | 10/2008 | Shaath et al. .................. | 707/640 |
| 2009/0150906 | A1 * | 6/2009 | Schmidt et al. ............... | 719/317 |
| 2010/0251128 | A1 * | 9/2010 | Cordasco ....................... | 715/736 |
| 2011/0106802 | A1 * | 5/2011 | Pinkney et al. ............... | 707/737 |
| 2011/0225287 | A1 * | 9/2011 | Dalal et al. .................... | 709/224 |

OTHER PUBLICATIONS

Wikipedia, "Web Analytics," downloaded from http://en.wikipedia.org/wiki/Web_analytics on Aug. 12, 2010 (last modified on Jul. 22, 2010), 11 pages.
Adobe Systems Incorporated, "Omniture: SiteCatalyst," User Guide, May 13, 2010, 130 pages.

* cited by examiner

*Primary Examiner* — Shahid Alam
(74) *Attorney, Agent, or Firm* — Robert C. Kowert; Meyertons, Hood, Kivlin, Kowert & Goetzel, P.C.

(57) ABSTRACT

Provided is a method that includes receiving a file from a network site, wherein the file defines display information for one or more content items, parsing the file to display the one or more content items. Parsing includes encountering, in the file, a request to transmit analytics data to a remote analytics site, delaying transmission of the analytics data to wait for encountering of subsequent requests in the file, encountering, in the file, one or more subsequent requests to transmit other analytics data to the remote analytics site, aggregating the analytics data and the other analytics data into an analytics request for the remote analytics site, and sending the analytics request to the remote analytics site, such that the remote analytics site receives the analytics data and the other analytics via the same analytics request.

20 Claims, 11 Drawing Sheets

```
index.html
<html>
<head>
</head>
<body>
<p> webpage data </p>

<Start Web Analytics Code>
<script language="JavaScript" type="text/javascript" src="js/s_code.js"></script>
<script language="JavaScript" type="text/javascript"><!--
s.prop1 = 'Hello';
var s_code=s.t()//--></script>
<End Web Analytics Code>

<input type="button" value="End Survey" onclick="
        myintegration.clearVars();
        myintegration.add('survey_end','');
        myintegration.add('survey_id','1234');
        myintegration.ready = true;
        myintegration.sendExtraData();"/>

<script language="JavaScript" type="text/javascript"
src="js/omniobject.js"></script>
<script language="JavaScript" type="text/javascript">

/*First Integration*/
var first_mapping = {
        'survey_start':'event1',
        'survey_end':'event2',
        'survey_id':{eVar:'eVar1',prop:'prop2'},
        'test_string':'eVar2'
}
var firstintegration = Genesis.enable('firstintegration', first_mapping);
firstintegration.add('survey_id','1234');
firstintegration.add('survey_start','');
firstintegration.add('test_string','hello');
firstintegration.ready = true;

/*Second Integration*/
var second_mapping = {
        'survey_begin':'event1',
        'survey_stop':'event2',
        'survey_name':{eVar:'eVar1',prop:'prop2'},
        'test_string':'eVar2'
}
var secondintegration = Genesis.enable('secondintegration', second_mapping);
secondintegration.add('survey_id','4321');
secondintegration.add('survey_begin','');
secondintegration.add('test_string','hi');
secondintegration.ready = true;

</script>
</body>
</html>
```

```
                              s.code.js
/* Web Analytics Code */ var s_account="user"
var s=s_gi(s_account)
/*********************** CONFIG SECTION ************************/
/* You may add or alter any code config here. */
s.charSet="ISO-8859-1"
/* Conversion Config */
s.currencyCode="USD"
/* Link Tracking Config */
s.trackDownloadLinks=true
s.trackExternalLinks=true
s.trackInlineStats=true
s.linkDownloadFileTypes="exe,zip,wav,mp3,mov,mpg,avi,wmv,doc,pdf,xls"
s.linkInternalFilters="javascript:,."
s.linkLeaveQueryString=false
s.linkTrackVars="None"
s.linkTrackEvents="None"

/* WARNING: Changing any of the below variables will cause drastic
changes to how your visitor data is collected.  Changes should only be
made when instructed to do so by your account manager.*/
s.visitorNamespace="user"
s.dc="112"
```
⎫
⎬ 242
⎭

```
s.genesisObjects = ['firstIntegration', 'secondIntegration'];
s.maxTimeout = 250;
```
⎫ 210a
⎭

```
s._t = s.t;
var _intv='';
setTimeout('s._force=true',250);
s._force=false
s.t = new Function("_intv=setInterval('s.check()', this.maxTimeout)");
s.check=new Function("x",""
+"var go=this.genesisObjects;var _go=_genesisObjects;if(this._force||"
+"_go.allReady(go)){clearInterval(_intv);for(var x=0;x<go.length;x++)"
+"{if(typeof _go[go[x]]!='undefined'&&_go[go[x]].isReady()){_go[go[x]"
+"]].assignProps(this);_go[go[x]].assignEvars(this);_go[go[x]].assignE"
+"vents(this);_go[go[x]].assignProducts(this);}}this._t();this.t=this"
+"._t;}");
```
⎫
⎬ 206a
⎭

```
/************ DO NOT ALTER ANYTHING BELOW THIS LINE ! *************/
var s_code='',s_objectID;function s_gi(un,pg,ss){var
c="=fun`o(~){`Ps=^O~.substring(~#1 ~.indexOf(~;@z~`e@z~=new
Fun`o(~.length~.toLowerCase()~`Ps#7c_il['+s^Zn+'],~=new
Object~};s.~`YMigrationServer~"
+".toUpperCase~){@z~','~s.wd~);s.~')q='~=new Array~ookieDom
```

FIG. 5

```
                                  omniobject.js
/**
 * Instantiates global _genesisObjects array on first
 * load then uses that object for subsequent genesis objects
 */ if(typeof window._genesisObjects == 'undefined') {
        window._genesisObjects = new Object;

/**
         * indicates that all the genesisObject are ready
         * @param {Array} o A list of named genesis object as outlined in the
remote code file.
         * @return {boolean} Returns true if all genesisObject are ready, false
if they are not
         */
        window._genesisObjects.allReady = function(o) {
                var x = 0;
                for(var i = 0; i < o.length ; i++) {
                        if(this[o[i]])
                                x += this[o[i]].isReady()?1:0;
                }
                return (x == o.length);
        }
}

/**
 * Named Genesis Object
 */
var Genesis = {
        /**
         * Method to initialize new object.  Manages the object by name and
         * assure that only one instance of a named object exists on the page at
         * a given time.
         * @param {String} n A given objects name.
         * @return {Object} Returns the objects instance.
         */
        enable : function(n,p) {
                if(n && typeof _genesisObjects[n] != 'undefined')
                        return _genesisObjects[n]
                else {
                        this.o = new Object
                        this.o.name = n;
                        this.o.s = '';
                        this.o.vars = new Array;
                        this.o.ready = false;
                        this.o.p = p;
                        _genesisObjects[n] = this.o;

/**
                         * Adds a new variable and value.
                         * @param {String} k A variable name as represented in the
mapping file.
                         * @param {String} v A variable value.
```

*FIG. 6A*

```
* Example:
* var _variable_mapping = {
* 'display_post':6,
* 'sum_of_life_span':1,
* 'forum_search_term':{prop:5,eVar:4}
* };
*/
this.o.add = function(k,v) {
        if(!v) v = '';
        if(typeof p[k]=='string')
                this.vars[p[k]] = v;
        else if(typeof p[k]=='function'){
                var t = p[k](m[k],v);
                for(var i=0;i<t.length;i++)
                        this.vars[t[i][0]]=t[i][1];
        }
        else if(typeof p[k]=='object'){
                this.vars[p[k]].eVar] = v;
                this.vars[p[k]].prop] = v;
        }
};
/**
* Private method that generically set variable by type
* @param {Object} o Omniture object.
* @param {String} type Type of Omniture variable
*/
this.o._setVars = function(o, type) {
        var t = this._getVars(type);
        for(var x in t)
                o[x] = t[x];
};
/**
* Private method that assembles events and products
*into comma delimited lists
* @param {Object} o Omniture object.
* @param {String} type Type of Omniture variable
*/
this.o._squishVars = function(o, type) {
        var t = this._getVars(type);
        this.s = o;

if(o[type+'s'] && o[type+'s'].length != 0)
                o[type+'s'] += ',';
        else
                o[type+'s'] = '';

for(var x in t)
                if(t[x]=='')
                        o[type+'s'] += x + ',';
                else
                        o[type+'s'] += t[x] + ',';

o[type+'s'] = o[type+'s'].substring(0, o[type+'s'].length-1);
};
/**
```

*FIG. 6B*

```
* Method to clear an objects instance variables
*/
this.o.clearVars = function() {
        this.vars = new Array;
};
/**
                                                                    254
* Method that creates a custom link request
*/
this.o.sendExtraData = function() {
        if(!this.s) return;
        var a = new Array;
        var v = new Array;
        var n = 0;
        var x = 0;
        console.debug(this.vars);
        for(var i in this.vars) {
                if(i.indexOf('event') > -1){
                        a[n++] = 'events';
                        v[x++] = i;
                }
                else if(i.indexOf('product') > -1){
                        a[n++] = 'products';
                        v[x++] = i;
                }
                else
                        a[n++] = i;

} this.s.linkTrackEvents = v.toString();
        this.s.linkTrackVars = a.toString();

this.assignProps(this.s);
        this.assignEvars(this.s);
        this.assignEvents(this.s);
        this.assignProducts(this.s);

this.s.tl(true,'o',this.name);
};
/**
* Method that assigns values to Omniture variable type 'prop'
* @param {Object} o Omniture object.
*/
this.o.assignProps = function(o) {
        this._setVars(o, 'prop');
        this._setVars(o, 'pageName');
        this._setVars(o, 'channel');
};
/**
* Method that assigns values to Omniture variable type 'eVar'
* @param {Object} o Omniture object.
*/
this.o.assignEvars = function(o) {
        this._setVars(o, 'eVar');
};
```

*FIG. 6C*

```
/**
    * Method that assigns values to Omniture variable type 'Events'
    * @param {Object} o Omniture object.
    */                                                                        254
   this.o.assignEvents = function(o) {
        this._squishVars(o, 'event');
   };
   /**
    * Method that assigns values to Omniture variable type 'prop'
    * @param {Object} o Omniture object.
    */
   this.o.assignProducts = function(o) {
        this._squishVars(o, 'product');
   };
   /**
    * Private method that gets all variables of a named type
    * @param {String} s Type of Omniture variable
    * @return {Array} Returns an array of variable types.
    */
   this.o._getVars = function(s) {
        var r = new Array;
        for(var i in this.vars)
            if(i.indexOf(s) > -1)
                r[i] = this.vars[i];
        return r;
   };
   /**
    * Method called to determine if named object is ready
    * @return {boolean} Returns true if the object is ready for
assigning variables.
    */
   this.o.isReady = function() {
        return this.ready;
   }
   return this.o;
   }
 }
}
```

*FIG. 6D*

AGGREGATED WEB ANALYTICS REQUEST SYSTEMS AND METHODS

BACKGROUND

Website providers often wish to collect data that describes usage and visitation patterns for their websites and for individual webpages within the sites. This data is often referred to as web analytics data. Such information can be extremely valuable in developing usage statistics for various purposes, including for example estimating server load, determining advertising rates, identifying areas of websites that are in need of redesign, and the like.

Web analytics data is often collected via logfile analysis or page tagging. Logfile analysis includes reading logfiles that store a web server's transactions. Page tagging uses executable code on each webpage, such as Java Script, to notify a third party when a webpage is rendered by a browser. For example, the webpage may include a request to a web analytics provider that is embedded within the Hypertext Markup Language (HTML) code. When the webpage is rendered by a browser at a user's computer, the request is transmitted to the web analytics, thereby notifying the web analytics provider of the rendering of the webpage. In some instances, the request includes a request for an image, and the web analytics provider simply returns a single transparent pixel for display by the browser, thereby fulfilling the request.

The request itself often includes web analytics data, such as data about the user, the user's computer, the content of the webpage, or any other web analytics data that is accessible and of interest. The web analytics provider may parse the request to extract web analytics data contained within the request. The collected web analytics data may be processed and provided to a website administrator for use in assessing and optimizing their website.

The webpage including the embedded request is typically provided via a content server operated, or at least under the direction of a content provider, such as an on-line vendor. In some instances, a webpage may include additional content that is integrated into the webpage, such as an advertisement provided by another content provider. Similar to the operator of the webpage, the provider of the additional content may also desire to collect web analytics data relating to their content and the user's interaction therewith and, thus, may desire to a send similar request to a web analytics provider to collect web analytics data. Unfortunately, providing multiple requests to the web analytics provider may impose additional difficulties, as the second content provider's request may need to be integrated into the webpage. For example, conflicts between multiple data points may needed to be resolved. If left unresolved, conflicts may result in one content provider's request overwriting data contained in another content provider's request, or the like. Moreover, the addition of multiple individual requests within the webpage may result in multiple requests being made to the web analytics provider. This can significantly increase the cost of collecting web analytics data as web analytics providers often charge a fee based on the number of requests.

Accordingly, it is desirable to provide technique for integrating multiple requests to a web analytics provider into a webpage, including resolving conflicts between requests and/or reducing the number of requests made to the web analytics provider.

SUMMARY

Various embodiments of methods and apparatus for providing web analytics data are described. In some embodiments, provided is a method that includes receiving a file from a network site, wherein the file defines display information for one or more content items, and parsing the file to display the one or more content items. Parsing includes: encountering, in the file, a request to transmit analytics data to a remote analytics site, delaying transmission of the analytics data to wait for encountering of subsequent requests in the file, encountering, in the file, one or more subsequent requests to transmit other analytics data to the remote analytics site, aggregating the analytics data and the other analytics data into an analytics request for the remote analytics site, and sending the analytics request to the remote analytics site, such that the remote analytics site receives the analytics data and the other analytics via the same analytics request.

In some embodiments, provided is a non-transitory computer readable storage medium storing computer-executable program instructions that when executed by a computer cause: providing, in response to receiving a request for a webpage, a file, wherein the file defines display information for one or more content items and wherein execution of the file is configured to cause: encountering, in the file, a request to transmit analytics data to a remote analytics site, delaying transmission of the analytics data to wait for encountering of subsequent requests in the file, encountering, in the file, one or more subsequent requests to transmit other analytics data to the remote analytics site, aggregating the analytics data and the other analytics data into an analytics request for the remote analytics site, and sending the analytics request to the remote analytics site, such that the remote analytics site receives the analytics data and the other analytics via the same analytics request.

In some embodiments, provided is a system that includes a content device to provide a file, wherein the file defines display information for one or more content items and wherein execution of the file is causes: encountering, in the file, a request to transmit analytics data to a remote analytics site, delaying transmission of the analytics data to wait for encountering of subsequent requests in the file, encountering, in the file, one or more subsequent requests to transmit other analytics data to the remote analytics site, aggregating the analytics data and the other analytics data into an analytics request for the remote analytics site, and sending the analytics request to the remote analytics site, such that remote analytics site receives the analytics data and the other analytics via the same analytics request.

BRIEF DESCRIPTION OF THE DRAWINGS

FIG. 4 illustrates exemplary index code of the webpage code, in accordance with one or more embodiments of the present technique.

FIG. 5 illustrates exemplary remote code of the webpage code, in accordance with one or more embodiments of the present technique.

FIGS. 6A-6D illustrate exemplary enablement object code of the webpage code, in accordance with one or more embodiments of the present technique.

Figure 1:
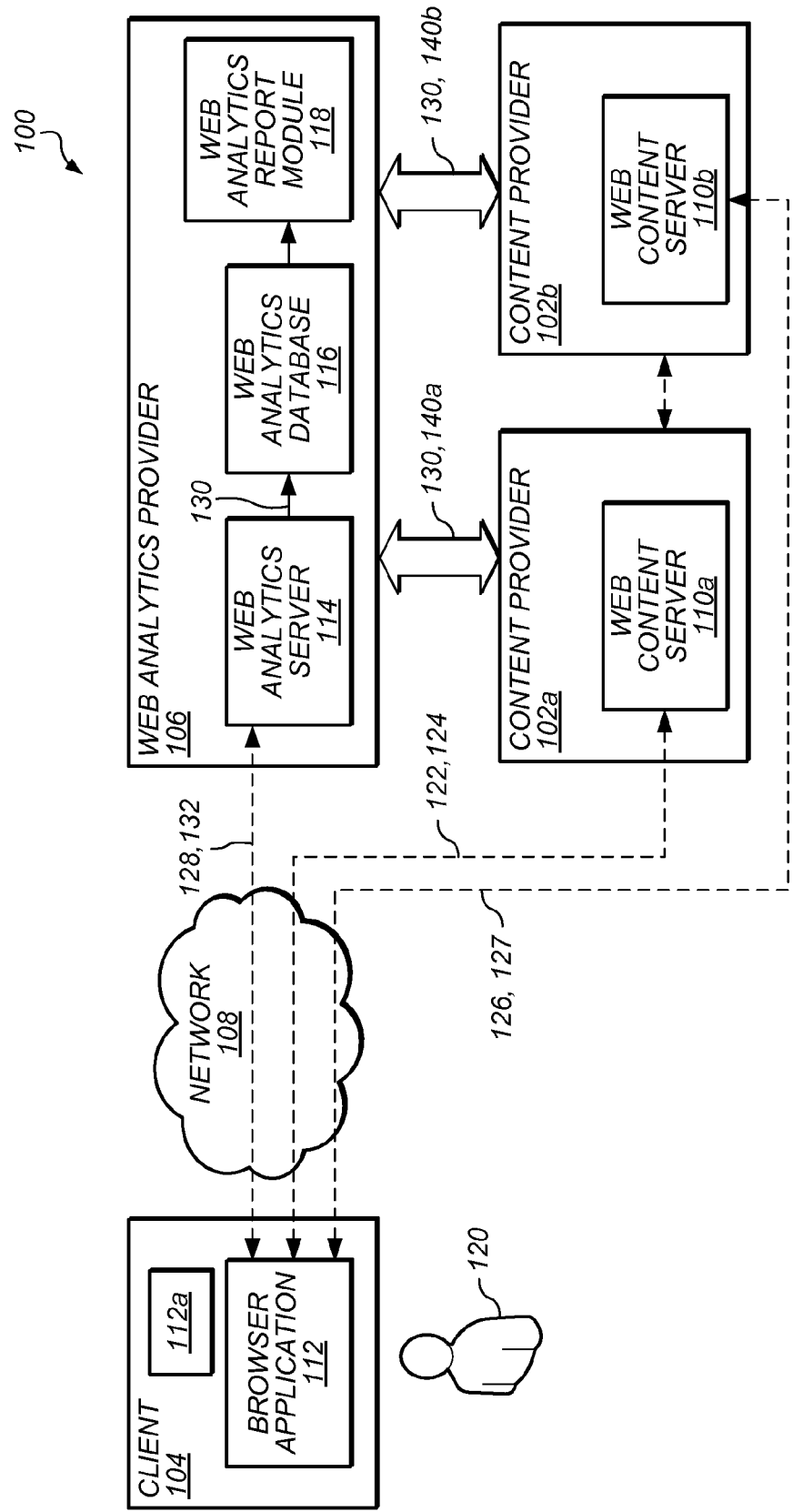
FIG. 1 as a block diagram that illustrates a web analytics system in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

A portion of the disclosure (e.g., FIGS. 4-6D and discussion related thereto) of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

As described in more detail below, provided in some embodiments are system and method for providing web analytics data. In some embodiments, upon execution/loading of a file from a network site, such as a webpage or webpage code corresponding thereto, a request including web analytics data embedded therein is assembled and transmitted to an entity, such as a web analytics provider. In certain embodiments, the request includes a combined request having web analytics data associated with one or more request (e.g., resident) executed during loading/parsing of the webpage code as well as web analytics data associated with one or more other request (e.g., integrated request) executed during loading/parsing of the webpage code. In some embodiments, processing and/or sending web analytics data associated with the resident request is delayed until web analytics data associated with the one or more other request is available. In certain embodiments, a single request may be assembled including the web analytics data associated with each of the requests may be transmitted to web analytics provider, as opposed to having to send a separate request associated with each of the resident or integrated requests. Although certain embodiments are described with respect to a webpage and/or website, it will be appreciated that the techniques disclosed herein may be employed with other forms of network content sites, such as file transfer protocol (FTP) sites, cloud computing environments, or the like.

Turning now to the figures, FIG. 1 as a block diagram that illustrates a web analytics system 100 in accordance with one or more embodiments of the present technique. In the illustrated embodiment, system 100 includes content providers 102a and 102b, a client 104 and a web analytics provider 106.

Each of content providers 102a and 102b, client 104 and web analytics provider 106 may be communicatively coupled to one another via a network 108. Network 108 may include any channel for providing effective communication between each of the entities of system 100. In some embodiments, network 108 includes an electronic communication network, such as the internet, a local area network (LAN), a cellular communications network, or the like. For example, network 108 may include an internet network used to facilitate communication between each of the entities (e.g., content providers 102a and 102b, client 104 and web analytics provider 106) of system 100.

Content providers 102a and/or 102b may include source of information/content (e.g., a file defining display information for one or more content items, such as a website) that is provided to client 104. For example content providers 102a and/or 102b may include vendor websites used to present retail merchandise to a consumer. In some embodiments, content providers 102a and 102b may include web content servers 110a and 110b, respectively. Web content servers 110a and 110b may include website content stored thereon, such as webpages, that are accessed and loaded by client 104 when viewing respective webpages of content provider 102a and 102b. In some embodiments, content providers 102a and/or 102b may provide content that is hosted by the server 110b or 110a of the other of content providers 102a and/or 102b. For example, where content provider 102a includes a retail merchant, new outlet, or the like, content provider 102b may supply content or other webpage data that is stored on and hosted by web content server 110a. In some embodiments, for example, content provider 102b and the HTML code for a webpage on web content server 110a may reference content at web content server 110b an/or provided by content provider 102b. Accordingly, accessing the webpage of content provider 102a may employ the content or webpage data provided by content provider 102b.

Client 104 may include a computer or similar device used to access content provided by content providers 102a and 102b. In some embodiments, client 104 may include a computer employing a browser application 112 that is used to interact with webpages and websites provided by content providers 102a and 102b. For example, browser application 112 may render a webpage of content provider 102a. Rendering may include executing HTML code for the webpage provided by content provider 102a. As a result, browser may also generate appropriate request for data from various servers of system 100 to assemble the webpage for display on client 104. Webpage 104 may be viewed by a user via a monitor or similar presentation device at client 104.

Web analytics provider 106 may include a system for the collection and processing of web analytics data. Web analytics provider 106 may include a third-party website traffic statistic service that is a physically separate entity from content providers 102a and 102b. Web analytics provider 106 may reside on a different network location from content providers 102a and 102b and client 104. Web analytics data may include data that describes usage and visitation patterns for websites and for individual webpages within the website. Web analytics data may include a user identifier, for example, as well information describing the webpages visited and the dates and times of the visits.

In the illustrated embodiment, web analytics provider 106 includes a web analytics server 114, a web analytics database 116, and a web analytics report module 118. Web analytics server 110 may service requests from one or more clients. For example, upon loading/rendering of a webpage 112a by browser 112 of client 104, browser 112 may generate a request to web analytics server 114 via network 108. Web analytics server 114 may process the request by returning appropriate content (e.g., an image) to browser 112 of client 104. In some embodiments, the request includes a request for an image, and web analytics provider 106 simply returns a single transparent pixel for display by browser 112 of client 104, thereby fulfilling the request. The request itself may also include web analytics data embedded therein. Some embodiments may include embedding a pointer to a resource, known as a "web bug" in HTML code. The resource may be invisible to the user, such as a transparent one-pixel image. The pointer may direct browser 112 of client 104 to request the resource from web analytics server 114. Web analytics server 114 may record the request, and record additional information associated with the request, such as the date and time, and/or identifying information that may be encoded in the resource request. In some embodiments, an image request embedded in the HTML code of the webpage may include codes/strings that are indicative of web analytics data, such as data about the user, the user's computer, the content of the webpage, or any other web analytics data that is accessible and of interest. A request for an image may include, for example, "image.gif/XXX . . . " wherein the string "XXX . . . " is indicative of the web analytics data. Web analytics provider 106 may parse the request (e.g., at server 114 or report module 118) to extract the web analytics data contained within the request. The web analytics data may be stored in web analytics database 116, or a similar storage/memory device. In some embodiments, web analytics report module 118 may receive or retrieve web analytics data from web analytics server 114 and/or database 116. Web analytics report module 118 may process the web analytics data to generate one or more web analytics reports. For example, web analytics report module 114 may filter the raw web analytics data received at web analytics server 114 to generate concise and complete web analytics reports, as may be requested by a website administrator of one of content providers 104*a*. Reports, for example, may include overviews and statistical analyses describing the relative frequency with which various site paths are being followed through the content provider's website.

In some embodiments, a user 120 interacts with a device at client 104, to execute a software application, such as browser application 112 of client 104, for accessing and displaying one or more webpages 112*a*. In response to a user command, such as clicking on a link or typing in a uniform resource locator (URL), browser application 112 may issue a webpage request 122 to web content server 110*a* of content provider 102*a* via network 108 (e.g., via the Internet). In response to request 122, web content server 110*a* may transmit the corresponding webpage code 124 (e.g., HTML code corresponding to webpage 112*a*) to browser application 112. Browser application 112 may interpret the received webpage code to display the requested webpage to user 120 at client 106. Browser application 112 may generate additional requests for content from the servers, as needed. For example, if the webpage code 124 calls for data to be provided by content provider 102*b*, browser application 112 may issue an additional request 126 to web content server 110*b*. Web content server 110*b* may provide a response 127 containing the requested data, thereby fulfilling the request.

In some embodiments, client 104 also transmits webpage visitation tracking information to web analytics provider 106. For example, webpage code 124 may include executable code to initiate a request for data from web analytics server such that execution of webpage code 124 at browser 112 causes browser 112 to generate a corresponding request 128 for the data to web analytics server 114. In some embodiments, request 128 may itself have web analytics data contained therein or associated therewith, such that transmitting request 128 causes transmission of web analytics data from client 104 to web analytics provider 106. For example, as described above, request 128 may include an image request having an embedded string of data therein. Web analytics provider 106 may process (e.g., parse) request 128 to extract web analytics data 130 contained in or associated with request 128. Where request 128 includes a request for an image, web analytics server 114 may simply return an image 132 (e.g., a single transparent pixel) to browser 112, thereby fulfilling request 128. In some embodiments, web analytics server 106 may transmit web analytics data 130 and/or a corresponding report to content providers 102*a* and/or 102*b*, or other interested entities. For example, web analytics data 130 (e.g., raw data) and/or web analytics reports 140*a* and 140*b* may be forwarded to site administrators of content providers 102*a* and 102*b*.

Figure 2:
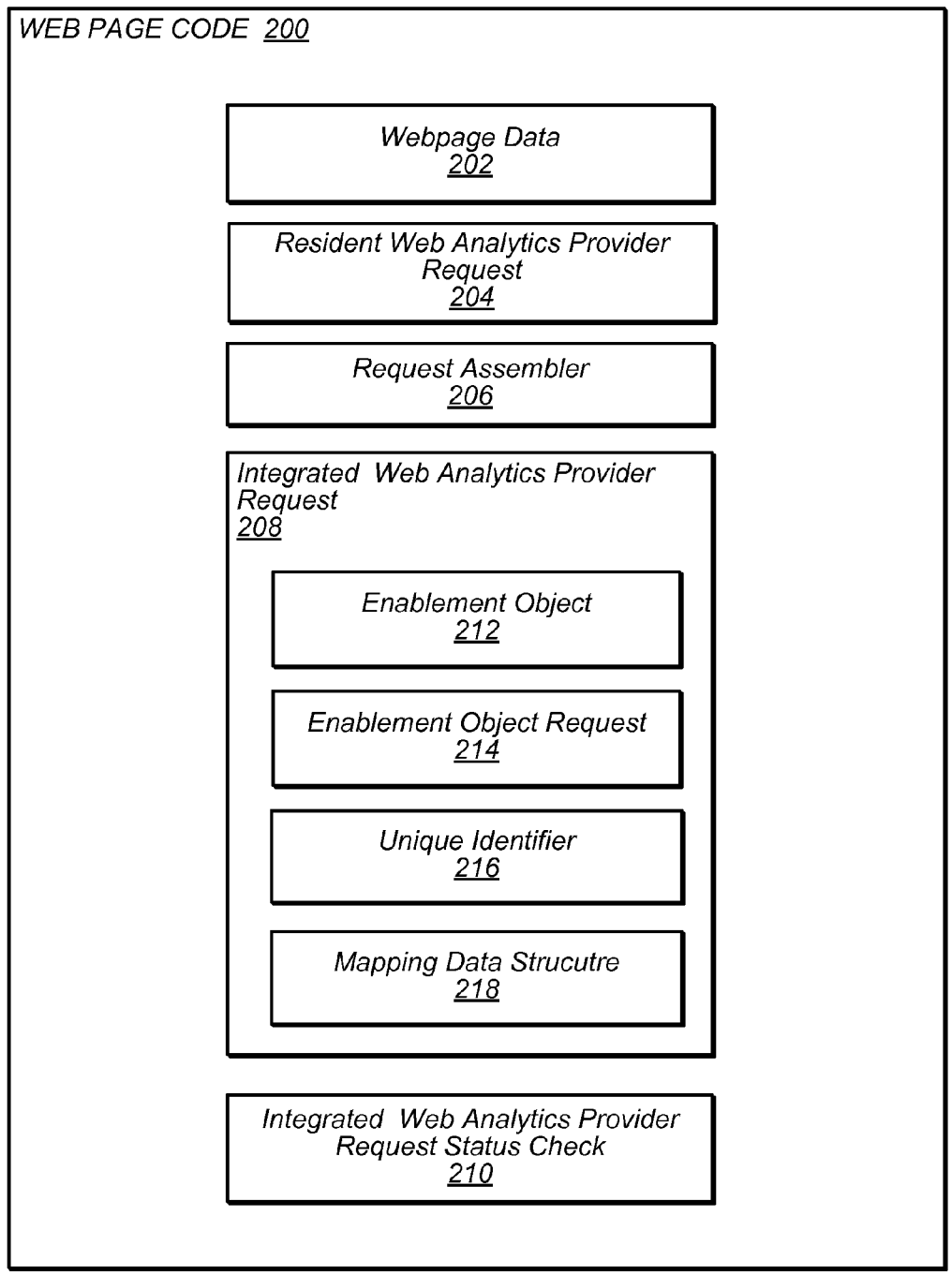
FIG. 2 is a diagram that illustrates webpage code in accordance with one or more embodiments of the present technique.

FIG. 2 is a diagram that illustrates webpage code 200 in accordance with one or more embodiments of the present technique. Webpage code 200 may include executable code that is provided in response to a request for a webpage or similar network site content. For example, webpage code 200 may be provided to browser application 112 of client 104 from web content server 110*a* of content provider 102*a* in response to a request from browser application 112 for the corresponding webpage. In some embodiments, webpage code may include HTML code that is executed to render webpage 112*a* at a presentation device of client 104 for viewing by a user.

In the illustrated embodiment, webpage code 200 includes webpage data 202, a resident web analytics provider request ("resident request") 204, request assembler 206, an integrated web analytics provider request ("integrated request") 208, and an integrated web analytics provider request status check ("integrated request status check") 210. In some embodiments, webpage data 202 may include traditional code for providing content of a webpage for viewing by a user. For example, webpage data 202 may include a definition of text to be displayed and/or images to be retrieved for display on the webpage.

Resident request 204 may include a portion of webpage code 200 that, upon execution, initiates sending a request to a web analytics provider that includes web analytics data. In some embodiments, resident web analytics provider request 204 may generate a request similar that of request 128 described above with respect to FIG. 1. For example resident web analytics provider request 204 may generate an image request having web analytics data embedded therein.

Request assembler 206 may include a portion of webpage code 200 that, upon execution, assembles web analytics data in accordance with one or more requests to the web analytics provider. In some embodiments, request assembler 206 includes logic that compiles the web analytics data into a sting that is embedded within a request similar that of request 128 described above with respect to FIG. 1. For example, request assembler 206 may generate an image request to be provided to a web analytics server, the image request including, for example, "image.gif/XXX . . . " wherein "image.gif" is indicative of an image and the string "XXX . . . " is indicative of the web analytics data. In some embodiments, request assembler may also include logic capable of assembling multiple requests (e.g., resident request and integrated request) into a single request that is to be transmitted to the web analytics provider.

Integrated request 208 may include a portion of webpage code 200 that, upon execution, initiates generation of a supplemental/subsequent request to be aggregated with (e.g., appended to or combined with) the resident request. Although a single integrated request 208 is illustrated, embodiments may include any number of integrated requests (e.g., two or more integrated requests). Thus, integrated request 208 may enable a single request to be transmitted to a web analytics provider that includes data associated with multiple requests (e.g., resident request 204 and integrated request 208). An integrated request may be desired, for example, by a third party having content integrated within webpage 200 that also desires to gather web analytics data related to the webpage and/or their content within the webpage.

In some embodiments, integrated request 208 includes an enablement object 212. Enablement object 212 may define a global variable that will store data relating to events, variables (e.g., eVars) and properties specified in integrated request 208. In some embodiments, enablement object 212 may include logic that formats the data associated with a given integrated request for synchronization with request assembler 206 such that data of the given integrated request may be aggregated with data of resident request(s) and/or other integrated requests. As described in more detail below, execution of integrated request 208 may initiate execution of enablement object 210. For example, integrated request 208 may include code (e.g., an enablement object request 214) that initiates execution of enablement object 212. As described in more detail below, integrated request 208 may include mapping data points and entry of data, associated with one or more data points, that is processed via execution of enablement object 214.

In some embodiments, integrated request 208 may include a definition of a unique object name ("unique identifier") 216 and a mapping data structure ("mapping") 218. Unique identifier 216 may identify the particular integration of code within webpage code 200. Providing a unique object name 216 may ensure that two or more integrations of code on the same webpage do not collide with one another. That is, elements within the particular integration may be associated with a given object name 216 for the particular integration such that elements (e.g., events, variable, properties, or the like) associated with the given unique identifier 216 are not overwritten and/or do not overwrite other similar elements of resident request 204 or another integrated request. For example, enablement object 212 may group execution based on the particular unique identifier 216 associated with each particular integration.

In some embodiments, mapping 218 may provide for the assignment of a variable name to be used within a particular integration with a web analytics data point available for tracking. For example, a data point commonly referred to as "event_1" with regard to the webpage, may be mapped/assigned to a unique name, such as "survey_start" in one integration and "survey_begin" in another integration. Thus, an integrator writing or modifying the webpage code 200 may be able to provide custom labels to known data point without having to know what the same data point is referred to as in another portion of webpage code 200, such as in another integrated request. In some embodiments, parsing the webpage code 200 may include for each one of the integrated requests, assigning a unique identifier 216 to the particular integrated request, mapping of one or more analytics data points to one or more respective data identifiers for the particular integrated request (wherein the mapping is associated with the unique identifier such that the analytics data values assigned to the data identifiers is associated with the particular request) and assigning one or more analytics data values to one or more of the data identifiers, wherein the one or more analytics data values are indicative of at least a portion of web analytics data associated with the integrated request.

Integrated request status check 210 may include a portion of code 200 that delays execution of generating a request to be sent to the web analytics provider until after all or some of the integrated request are ready to be assembled, and/or a timeout condition has occurred. In some embodiments, integrated request status check 210 waits until an indication has been provided that each integration is ready (e.g., an enablement object has been enabled and data values specified in the particular integration have been set) prior to proceeding with assembling a request to be sent to the web analytics data provider. In some embodiments, status check 210 may include a timeout such that any integrated request that is not ready prior to the execution of the timeout may be ignored. Upon completion of status check 210 (e.g., all integrations are ready or a timeout condition has occurred), webpage code 200 may continue to execution of assembling a request to be sent to the web analytics provider by executing request assembler 206 of webpage code 200. In some embodiments, request assembler 206 generates a request (e.g., request 128) that includes web analytics data corresponding to multiple requests (e.g., resident request(s) and integrated request(s) that are ready prior to a timeout condition).

It will be appreciated that each of these elements of webpage code 200 may be implemented within a single web code document/file/module, or may be provided in separate documents/files/modules. For example, as described in certain embodiment below, a remote code file may contain code for webpage data 202, request 204 and integrated request 208, a separate "s_code" file/document/code may include code for assembler 206 and integrated request status check 210, and an enablement object file may include code for enablement object 212.

Figure 3:
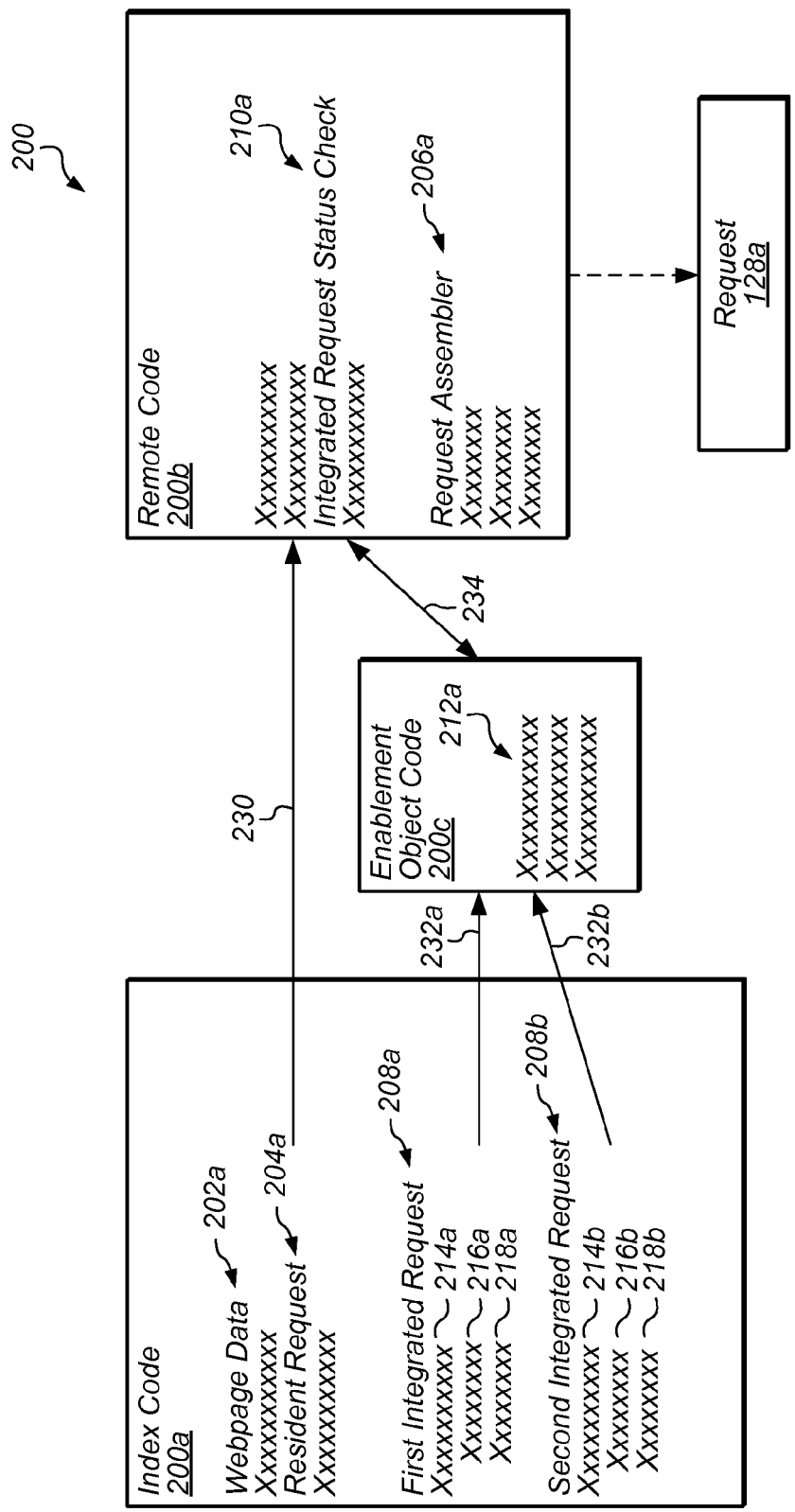
FIG. 3 is a diagram that illustrates exemplary location and execution/flow of webpage code in accordance with one or more embodiments of the present technique.

FIG. 3 is a diagram that illustrates exemplary location and execution/flow of webpage code 200 in accordance with one or more embodiments of the present technique. In the illustrated embodiment, index code 200a includes a first document/file/module that includes webpage data 202a, resident request(s) 204a, a first integrated request 208a and a second integrated request 208b. Each of first and second integrated request 208a and 208b includes respective enablement object requests 214a and 214b, unique identifiers 216a and 216b and mapping data structures 218a and 218b. Remote code 200b includes a second document/file/module that includes an integrated request status check 210a and request assembler 206a. Enablement object code 200c includes a third document/file/module that includes enablement object 212a. Such modularity of webpage code 200 may simplify creating and modification of webpage code 200, as a single document/file/module may be modified or replaced to change the functionality of webpage code 200.

During execution of webpage code 200, as index code 200a is executed from top to bottom in accordance with customary HTML code execution, resident request 204a may be executed as webpage data 202a is executed. Execution of resident request 204a may include a call to initiate execution of remote code 200b, as represented by arrow 230. In an embodiment that does not include an integrated request status check 210a, remote code 200b may execute from top to bottom without delay and/or without regard to execution of other webpage code 200. Thus, request assembler 206a may be executed to send a request (e.g., request 128a) to a web analytics provider that corresponds to resident request 204a without any regard for whether or not data of the integrated request is aggregated with the request.

In some embodiments, such as that illustrated, remote code 200b may include an integrated status check 210a that is executed. In contrast to the above described embodiment, execution of integrated status check 210a may command remote code 200b to check the status of each of the integrated requests listed in integrated request status check 210a (e.g., check the status of first integrated request 208a and/or 208b) and to proceed with execution of subsequent portions of remote code 200b (e.g., request assembler 206a) if all of the integrated requests listed are ready and/or a timeout occurs prior to all of the integrated requests listed being ready. For example, remote code will not proceed until each request is ready or a given period of time expires, whichever occurs first.

Notably, execution of the remainder of index code 200a and/or enablement object 200c may occur in parallel with execution of remote code 200b. For example, after executing resident request 204a, first integrated request 208a may be executed followed by execution of second integrated request 208b. Execution of each of enablement object request 214a and 214b of each integrated request 208a and 208b may initiate respective executions of enablement object code 200c, as represented by arrows 232a and 232b. Each of the respective executions of enablement object 200c may be associated with the unique identifier 216a or 218b and mapping data structure 218a or 218b for each respective integrated request 208a and 208b. As execution of each integrated request completes, a status of the integration may be set to true (e.g., via execution of the line of code "firstintegration.ready=true") and will be reflected via execution of enablement object code 212a to store the status.

In some embodiments, the status of each integration may be recognized by integrated status check 210a. For example, integrated status check 210a may poll the status of each of the listed integrations until they are all set to ready and/or a timeout occurs, as depicted by arrow 234. Upon completing the integrated request status check 210a (e.g., upon each of the remote code status being set to ready or a timeout), remote code 200b may continue execution of request assembler 206a. Request assembler 206a may include logic that assembles one or more request to be forwarded to a web analytics provider. For example, where each of first and second integrated request 208a and 208b executed/completed prior to a timeout of integrated request status check 210a, request assembler 206a may be executed to generate a single request 128a to web analytics provider (e.g., to web analytics server 114 of web analytics provider 106) that includes web analytics data corresponding to each executed request (e.g., resident request 204a, first integrated request 208a and second integrated request 208b). Where, for example, first integrated request 208a executed/completed prior to a timeout of integrated request status check 210a and second integrated request 208b did not execute/complete prior to a timeout of integrated request status check 210a, request assembler 206a may be executed to generate a single request 128a to the web analytics provider that includes web analytics data corresponding to each executed request (e.g., resident request 204a and first integrated request 208a) and not including web analytics data corresponding to the unexecuted request (second integrated request 208b) or at least the unexecuted/completed portion of the unexecuted/completed request. In some embodiments, request assembler 206a may be modified to include logic that generates any number of requests. For example, a first request generated and transmitted may include web analytics data corresponding to combination of requests (e.g., resident and/or integrated request) and another request generated and transmitted may include web analytics data corresponding to another combination of requests (e.g., resident and/or integrated request).

Such embodiments may enable integrating multiple requests to a web analytics provider into webpage code, including resolving conflicts between requests and/or reducing the number of requests made to a web analytics provider.

FIG. 4 illustrates an exemplary portion of index code 200a of webpage code 200, in accordance with one or more embodiments of the present technique. In the illustrated embodiment, index code 200a includes a document/file/module entitled "index.html". Index code 200a may include features similar to or the same as those described with regard to index code 200a of FIG. 3.

In the illustrated embodiment index code 200a includes webpage data 202a, a resident request 204a, a first integrated request 208a (including an enablement object request 214a, a unique identifier 216a and a mapping data structure 218a), and a second integrated request 208b (including an enablement object request 214b, a unique identifier 216b and a mapping data structure 218b). In the illustrated embodiment, webpage data 202a includes a paragraph including the character sting "webpage data" as indicated by traditional HTML structured tags. Other embodiments may include any type of data located at any part of webpage code 200a.

In the illustrated embodiment, resident request 204a includes setting of a variable as indicated by the line code "s.prop1='Hello'". Resident request 204a also includes a line of code "var s_code=s.t( )//—></script>" that, when executed, initiates execution of remote code document/file/module (e.g., a remote code 200b entitled "s_code.js", described in more detail below wither respect to FIG. 5). As described herein, in some embodiments, subsequent to initiation of resident request 204a, webpage code 200 may include additional code to delay completion/transmission of resident request 204a until other related requests (e.g., integrated request) have been completed/executed (e.g., are ready) and/or a timeout has occurred. For example, the remote code may include an integrated request status check, as described in more detail below with respect to FIG. 5.

Integrated request 208a and 208b may include unique identifiers 216a and 216b. For example, in the illustrated embodiment, first integrated request 208a includes the name "firstintegration" and second integrated request 208a includes the name "secondintegration" that is unique/different from the first name. In some embodiments, all integrated request are associated with a unique identifier that is different from any of the other identifiers associated with any of the other resident and/or integrated requests. A unique identifier may allow an enablement object to execute each of the resident and integrated requests without conflict.

Integrated request 208a and 208b may also include respective mapping structures 218a and 218b. Mapping structures 218a and 218b may provide for the assignment of a variable name to correspond with a web analytics data point available for tracking, where the assignment is to be used within a particular integration. In the illustrated embodiment, for example, first mapping structure 230a (which is to be associated with the first integration) assigns values "survey_start" to "event1"; "survey_end" to "event2", "survey_id" to "eVar: 'eVar1',prop:'prop2'" and "test_string" to "eVar2". Second mapping 218b is the same as first mapping 218a, except "survey_begin" (as opposed to "survey_start") is assigned to "event1", and second mapping is to be associated with the second integration. Mapping structures may be generated with the aid of a wizard that enables a user to assign values/names to some or all of the web analytics data points made available for tracking. For example, a user may be provided by the wizard with a displayed listing of all available data points to track for the given webpage, and may simply enter/select colloquial names for each of the given datapoints. The colloquial names may be referred to in subsequent coding in place of the original names of the datapoints.

In the illustrated embodiment, as index code 200a is executed (e.g., from top to bottom), each mapping 218a and 218b may be executed prior to execution of each respective enablement object requests 214a or 214b. In the illustrated embodiment, enablement object requests 214a includes a line of code to request execution of enablement object document/file/module (e.g., enablement object code 200c entitled "omniobject.js", described in more detail below wither respect to FIGS. 6A-6D). Enablement object 214a may initiate execution of execution of the enablement object document/file/module in association with the "firstintegration" and employing the "first_mapping". For example, the line of code "var firstintegration=Genesis.enable ('firstintegration', first_mapping);" used to request execution of the enablement object with regard to the unique identifier 216a and the corresponding mapping structure 218a. Similarly, enablement object request 214b may include a line of code to request execution of enablement object code 200c in association with the "secondtintegration" and using the "second_mapping".

In some embodiments, integrations 208a and 208b include assignments 217a and 217b of various vales/data to respective datapoints. For example, in the illustrated embodiment, within assignments 217a, "survey_id" is assigned a value of "1234" according to the mapping (e.g., a string is mapped to "eVar1"), "survey_start" is associated with a status of a particular event it is mapped to (e.g., "event1") as indicated by the quote character, and "test_string" is assigned a value of "hello" according to the mapping (e.g., a string is mapped to "eVar2"). Second integration 208b includes similar assignments of values.

In some embodiments, each integration includes setting of a status indicative of the integration being complete. For example, in the illustrated embodiment, each of the first and second integrations 208a and 208b end with a line of code setting a "ready" status to "true", thereby indicating that the integration has completed. Notably, setting the status may be performed after all other steps of the respective integration have been performed. Depending on the amount of time required to execute index code 200a, and more particularly, each integration, the "ready" status for each integration may or may not be set to true prior to a timeout of an integration request status check described in more detail below with respect to FIG. 5.

In some embodiments, index code 200a may include other features that are responsive to additional actions relating to the webpage corresponding to webpage code 200. For example, in the illustrated embodiment index code 200a includes an additional coding 240 that initiates generating and sending of an additional request to the web analytics provider upon a user selection of an "End Survey" button. Accordingly, although the integrations may be performed upon loading of the webpage, an additional request may be generated and sent to the web analytics provider upon further user interaction with the webpage.

FIG. 5 illustrates an exemplary portion of a remote code 200b of webpage code 200, in accordance with one or more embodiments of the present technique. In the illustrated embodiment, remote code 200b includes a document/file/module entitled "s_code.js". Remote code 200b may include features similar to or the same as those described with regard to remote code 200b of FIG. 3. Remote code 200b may be called via execution of resident request 204a of index code 200a, as discussed above.

In some embodiments, remote code 200b includes a code for configuring how request are to be assembled and sent. For example, code portion 242 and/or request assembler 206a may include logic for assembling received elements (e.g., web analytics data) of resident request 204a and integrated requests 208a and 208b into one or more request to be forwarded to the web analytics provider. In some embodiments, the logic may assemble an image request that includes the web analytics data from two or more of the resident and/or integrated request embedded therein. For example, the logic may generate an image request including "image.gif/XXX . . . " wherein the string "XXX . . . " is indicative of the web analytics data for resident request 204a, integrated requests 208a and/or integrated request 208b, as described above.

In some embodiments, remote code 200b includes an integrated request status check to assess whether or not integrated request(s) have been executed and are, thus ready. For example, in the illustrated embodiment, remote code 200b includes integrated request status check 210a, including the lines of code "s.genesisObjects=['firstintegration', 'second-integration'];" and "s.maxTimeout=250;". Thus, after code portion 242 has executed and prior executing code portion 244, remote code 200b may wait until each of the listed integration requests (e.g., "firstintegration"/integration request 208a and "secondintegration"/integration request 208a) have executed/completed as may be indicated by execution of the line of code "firstintegration.ready=true" and "secondintegration.ready=true" or until 250 milliseconds have passed to trigger the timeout condition. For example, as described above, integrated request status check 210a may poll the status of each of the listed integrations until they are all set to ready and/or a timeout occurs. Upon completing the integrated request status check 210a (e.g., upon each of the remote code status being set to ready or a timeout), remote code 200b may continue execution of request assembler 206a portion of remote code 200b.

FIGS. 6A-6D illustrate an exemplary portions of enablement object code 200c of webpage code 200, in accordance with one or more embodiments of the present technique. In the illustrated embodiment, enablement object code 200c includes a document/file/module entitled "omniobject.js". Enablement object code 200c may include features similar to or the same as those described with regard to enablement object code 200c of FIG. 3. Enablement object code 200c may be called via execution of enablement object requests 214a and 214b and other portions of integration request 208a and 208b of index code 200a, as discussed above.

In some embodiments, enablement object code 200c instantiates a global variable array for storing received values of variables. In some embodiment, a global variable array includes a status of each of the integration request (e.g., integration requests 208a and 208b). In some embodiments, enablement object code 200c includes logic to provide an indication that not all or all of the integration request are ready. For example, an integration status portion 250 may provide a Boolean value of "true" if all integration request are completed/ready or a Boolean value of "false" if all integration request are not ready/completed. The Boolean value may be read via integrated request status check 210a of remote code 200b to determine whether or not to continue with execution of request assembler 206a. For example, upon execution of integrated request status check 210a the Boolean value may be polled to assess whether or not the status is "true" or "false", and may proceed only once the status is "true" or a timeout condition has occurred.

In some embodiments, enablement object code 200c includes initialization of objects based on a unique identifier and/or a mapping data structure. For example, upon a call to enablement object 200c via execution of enablement object request 214a of first integration request 208a, enablement object may execute initialization code 252 to generate an instance of an object associated with the name "firstintegration" and mapping structure "first_mapping". Accordingly, values assigned during execution of first integration request 208a may be stored in the global variable according to the first mapping structure 218a and in association with the unique identifier 216a (e.g., "firstintegration"). Similar techniques may be employed with regard to second integration 208b.

In some embodiments, enablement object code 200c includes assignment of values to datapoints (e.g., properties, variables, events, or the like). For example, in the illustrated embodiment, enablement object code 200c includes assignment code portion 254. Upon execution of integrated request 208a, enablement assignment code portion 254 of object code 200c is executed such that "survey_id" is assigned a value of "1234" according to the mapping (e.g., a string is mapped to "eVar1"), "survey_start" is associated with a status of a particular event it is mapped to (e.g., "event1") as indicated by the quote character, and "test_string" is assigned a value of "hello" according to the mapping (e.g., a string is mapped to "eVar2"). Second integration 208b includes similar assignments of values. Second integration 208b includes similar assignments of values that may be implemented via execution of assignment code portion 254 of enablement object code 200c. Execution of assignment code portion 254 may provide for the consolidation of web analytics data for integrated request into a form that can be interpreted and assembled via request assembler 206a portion of remote code 200b, as described above.

Webpage code 200, including exemplary coding described with respect to FIGS. 4-6D may be executed in accordance with the techniques similar to those described above with respect to FIG. 3.

Figure 7:
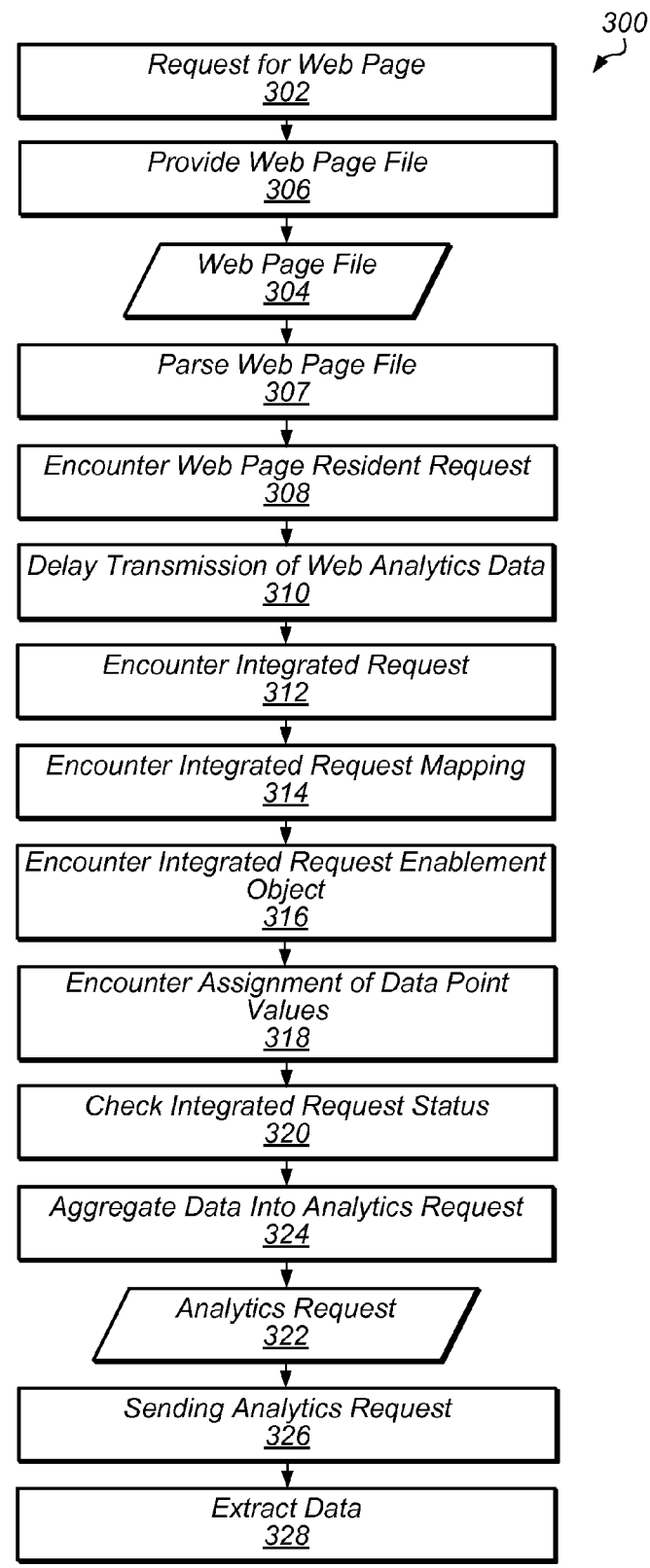
FIG. 7 is a flowchart that illustrates a method of providing a request in accordance with one or more embodiments of the present technique.

FIG. 7 is a flowchart that illustrates a method 300 of providing a request in accordance with one or more embodiments of the present technique. In some embodiments, the request may include web analytics data embedded therein and may be provided to a web analytics provider for processing. Method 700 may be implemented using system 100 and or one or more techniques described herein with regard to system 100. Method 300 generally includes a request to load a webpage, providing the webpage file, executing a resident request within the webpage, waiting for execution of integrated request within the webpage (e.g., executing a mapping, executing an enablement object request and assigning data point values corresponding to the integrated request), checking the status of the integrated request and assembling and transmitting the request based on the status of the integrated request.

In some embodiments, method 300 includes a request for a webpage, as depicted at block 302. A request for a webpage may be generated by a client device and received at a server device for serving the request. For example, browser application 112 of client device 104 may generate a request for webpage 112a that is transmitted to web content server 110a of content provider 102a. In some embodiments, a request for a webpage is generated via a client's selection of a hyperlink or similar input requesting to load a particular webpage or similar content from a network site for providing content (e.g., an file transfer protocol (FTP) site).

In some embodiments, method 300 includes providing a webpage file 304, as depicted at block 306. Providing the webpage file may include providing a file comprising code defining the webpage requested at block 302. For example, in response to receiving a request for the webpage, web content server 110a of content provider 102a may transmit to browser application 112 of client 104, webpage file 304. In some embodiments, some or all of webpage file 304 may be provided in the form of one or more documents/files/modules. For example, webpage file 304 may be provided as HTML code for execution by browser application 112. In some embodiments, webpage file 304 may include one or more of the features described herein with respect to webpage 212a. For example, webpage file 304 may include webpage code 200 similar to that described with respect to FIGS. 2-6D).

In some embodiments, method 300 may include parsing webpage file 304, as depicted at block 307. Parsing the webpage file 304 may include a webpage browser or similar application executing webpage code contained within webpage file 304. Accordingly, parsing webpage file 304 may include step-by-step encountering and execution of one or more portions of web page file 304.

In some embodiments, method 300 includes encountering a webpage resident request, as depicted at block 308. Encountering a webpage resident request may include a request to transmit analytics data to a remote analytics site. In some embodiments, encountering a webpage resident request may include executing code embedded within webpage 304 that, when executed, generates a request to a web analytics server. For example, executing webpage resident request may include executing resident request 204/204a as described herein with respect to webpage code 200.

In some embodiments, method 300 includes delaying transmission of web analytics data, as depicted at block 310. Delaying transmission of web analytics data may include delaying assembly of a request including data corresponding to the resident request until integrated request(s) within the webpage have completed execution, or have failed to execute in a given period of time. For example, delaying transmission of web analytics data may include employing integrated request status check 210/210a to wait for execution of integrated request 204/204a as described herein with respect to webpage code 200. In some embodiments, delaying transmission of web analytics data may include delaying aggregation and/or sending of an analytics request to a web analytics provider until some or all of the integrated request have executed (e.g., are "ready") and/or a given period of time has expired, resulting in timeout condition. Such a technique may enable web analytics data from multiple requests (e.g., resident and/or integrated request) to be assembled into a single request that is ultimately provided to a web analytics provider.

In some embodiments, method 300 includes encountering a subsequent request, as depicted at block 312. Encountering a subsequent request may include encountering and executing one or more integrated request within the webpage code of file 304. In some embodiments, In some embodiments, encountering a subsequent request includes encountering an integrated request mapping, as depicted at block 314. Encountering an integrated request mapping may include executing code for assignment of a variable name (e.g., to be used within a particular integration) to a web analytics data point available for tracking, as described herein. For example, encountering an integrated request mapping may include executing mapping data structure 218/218a/218b as described herein with respect to webpage code 200.

In some embodiments, encountering a subsequent request includes encountering an integrated request enablement object, as depicted at block 316. Encountering an integrated request enablement object may include initiating and/or executing an enablement object that provides for the assignment of values to datapoints (e.g., properties, variables, events, or the like) that may be extracted by data assembler for inclusion within the request ultimately forwarded to the web analytics provider. For example, encountering an integrated request enablement object may include executing an enablement object request 214/214a/214b and/or enablement object code 200c as described herein with respect to webpage code 200.

In some embodiments, encountering a subsequent request includes encountering assignment of data point values, as depicted at block 318. Encountering assignment of data point values may include executing a portion of an integration request that assigns of values to datapoints (e.g., properties, variables, events, or the like) in accordance with the mapping data structure and/or a unique identifier corresponding to the particular integration request. For example, encountering assignment of data point values may include executing lines of index code 200a of FIG. 5 such that "survey_id" is assigned a value of "1234" according to the mapping (e.g., a string is mapped to "eVar1"), "survey_start" is associated with a status of a particular event it is mapped to (e.g., "event1") as indicated by the quote character, and "test_string" is assigned a value of "hello" according to the mapping (e.g., a string is mapped to "eVar2"). Second integration 208b includes similar assignments of values. This assigned data may be representative of web analytics data and may be represented in the assembled request transmitted to the web analytics provider. The web analytics provider may, thus, process the request (e.g., parse the request) for the data point values to extract the web analytics data contained within the request.

In some embodiments, method 300 includes checking an integrated request status, as depicted at block 320. Checking an integrated request status may include encountering and/or executing code for assessing a status value for each of the integrated request contained within the web page code. For example, checking integrated request status may include encountering and executing integrated request status check 210/210a, as described above to determine whether some or all of the integrated request have executed (e.g., are "ready") and/or a given period of time has expired, resulting in timeout condition.

In some embodiments, method 300 includes aggregating data into an analytics request 322, as depicted at block 324. Aggregating data into an analytics request may include assembling web analytics data from two or more resident and/or integrated request into a single request that is to be forwarded to the web analytics provider. For example, aggregating data into an analytics request may include executing request assembler 206a of remote code 200b, including logic to aggregate data from multiple request into a single request. In some embodiments, analytics request 322 is not assembled until after all request and integrated request have executed and/or a timeout condition has occurred at the step of checking for integrated request status, as depicted at block 320. In some embodiments, analytics request 322 may include an image request. For example, analytics request 322 may include a request for an image "image.gif/XXX . . ." wherein the string "XXX . . ." is indicative of the web analytics data associated with multiple requests. Analytics request 322 may be similar to request 128/128a described herein.

In some embodiments, method 300 includes sending the analytics request 322, as depicted at block 326. Sending the analytics request may include transmitting analytics request 322 from a client executing a portion of webpage code 200 to a remote analytics site (e.g., the web analytics provider), such that the remote analytics site receives the analytics data associated with the resident request and the other analytics data associated with the integrated request(s) via the same analytics request. For example, request assembler code 206a may include commands to send analytics request 322 to web analytics server 114. Accordingly, web analytics server 114 may receive, from client 104, web analytics data corresponding to multiple requests (e.g., resident and/or integrated requests) in the form of a single request, such as a single image request. For example, web analytics data from resident requests and/or integrated requests may be aggregated/assembled into a string "XXX . . ." that is provided within the analytics request "image.gif/XXX . . .".

In some embodiments, method 300 includes extracting data, as depicted at block 328. Extracting data may include processing analytics request 322 to extract web analytics data embedded therein. For example, web analytics server 114 and/or report module 118 may parse the analytics request "image.gif/XXX . . ." to extract the string "XXX . . ." indicative of the web analytics data associated with each of the corresponding resident and/or integrated requests. In some embodiments, the extracted web analytics data may be processed and/or included on web analytics reports 140a and 140b.

It will be appreciated that method 300 is an exemplary embodiment of a method employed in accordance with techniques described herein. Method 300 may be may be modified to facilitate variations of its implementations and uses. For example, although some embodiments have been descried with respect to webpages, the techniques may be applied for use with similar network content site, such as an (FTP) site, cloud computing environment, or the like. Method 300 may be implemented in software, hardware, or a combination thereof. The order of method 300 may be changed, and various elements may be added, reordered, combined, omitted, modified, etc.

Exemplary Computer System

Figure 8:
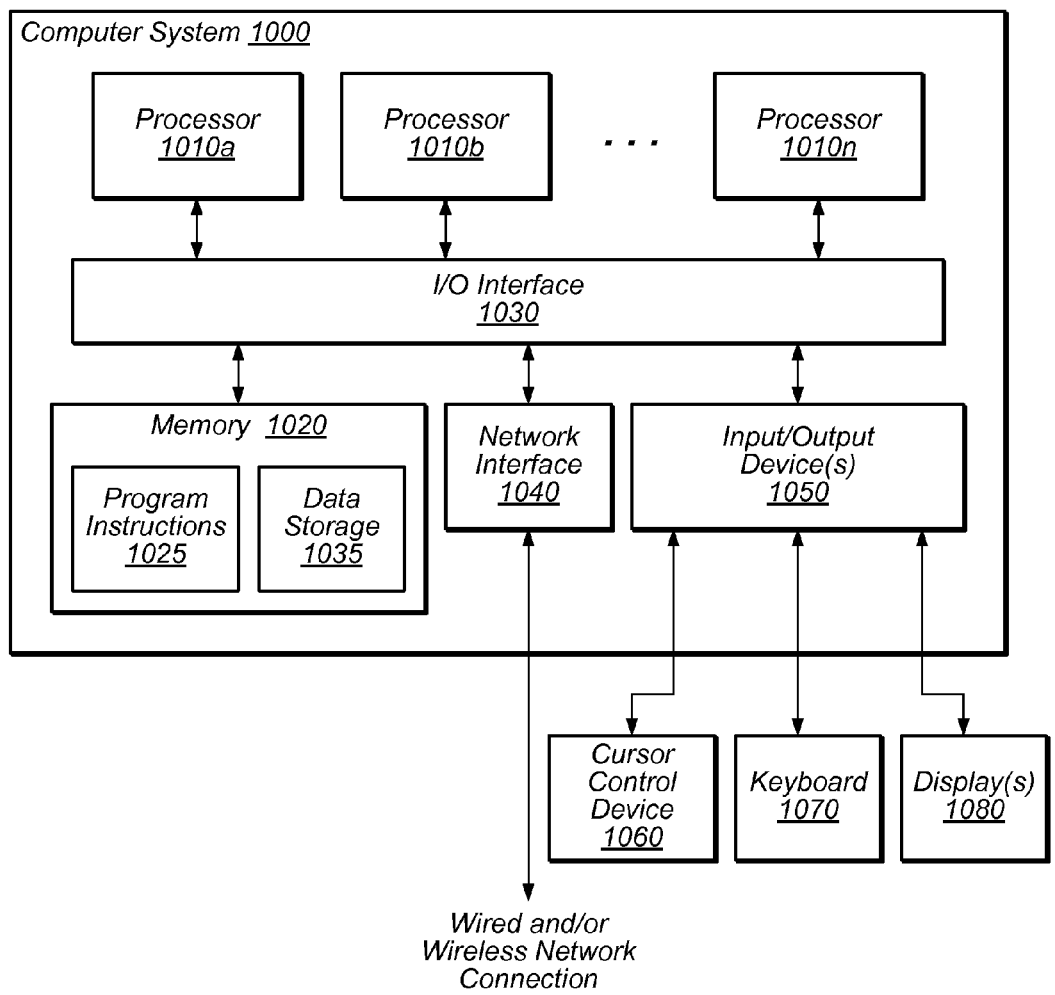
FIG. 8 is a diagram that illustrates an exemplary computer system in accordance with one or more embodiments of the present technique.

Various portions of system 100, as described herein, may be executed on one or more computer systems, which may interact with various other devices. For example, content providers 102a/102b, client 104, web analytics provider 106, web content servers 110a/110b, browser application 112, web analytics server 114, web analytics database 116 and/or web analytics report module 118 may each include, employ or be executed on one or more computer systems. FIG. 8 is a diagram that illustrates an exemplary computer system in accordance with one or more embodiments of the present technique. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures. Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Various modifications and changes may be to the above technique made as would be obvious to a person skilled in the art having the benefit of this disclosure. It is intended that the invention embrace all such modifications and changes and, accordingly, the above description to be regarded in an illustrative rather than a restrictive sense. While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A method, comprising:
    receiving a file from a network site, wherein the file defines display information for one or more content items;
    parsing the file to display the one or more content items, wherein said parsing comprises:
        encountering, in the file, a request to transmit analytics data to a remote analytics site;
        delaying transmission of the analytics data to wait for encountering of subsequent requests in the file;
        encountering, in the file, one or more subsequent requests to transmit other analytics data to the remote analytics site;
        aggregating the analytics data and the other analytics data into an analytics request for the remote analytics site; and
        sending the analytics request to the remote analytics site, such that the remote analytics site receives the analytics data and the other analytics via the same analytics request.

2. The method of claim 1, wherein the analytics request is sent to the remote analytics site as an image request.

3. The method of claim 1, wherein said delaying transmission comprises delaying transmission until after receiving an indication that the other analytics data is ready.

4. The method of claim 1, wherein said delaying transmission comprises delaying transmission at least until after a timeout occurs.

5. The method of claim 1, wherein said parsing the file further comprises, for each of one or more of the subsequent requests:
    assigning a unique identifier to the particular subsequent request;
    mapping of one or more analytics data points to one or more respective data identifiers for the particular subsequent request, wherein the mapping is associated with the unique identifier such that the analytics data values assigned to the data identifiers is associated with the particular request; and
    assigning one or more analytics data values to one or more of the data identifiers, wherein the one or more analytics data values are indicative of at least a portion of the other analytics data.

6. The method of claim 1, wherein said file comprises webpage code.

7. A non-transitory computer readable storage medium storing computer-executable program instructions that when executed by a computer cause:
    providing, in response to receiving a request for content, a file that defines display information for one or more content items and wherein execution of the file is configured to cause:
        encountering, in the file, a request to transmit analytics data to a remote analytics site;
        delaying transmission of the analytics data to wait for encountering of subsequent requests in the file;
        encountering, in the file, one or more subsequent requests to transmit other analytics data to the remote analytics site;
        aggregating the analytics data and the other analytics data into an analytics request for the remote analytics site; and sending the analytics request to the remote analytics site, such that the remote analytics site receives the analytics data and the other analytics via the same analytics request.

8. The medium of claim 7, wherein the analytics request is sent to the remote analytics site as an image request.

9. The medium of claim 7, wherein said delaying transmission comprises delaying transmission until after receiving an indication that the other analytics data is ready.

10. The medium of claim 7, wherein said delaying transmission comprises delaying transmission at least until after a timeout occurs.

11. The medium of claim 7, wherein said parsing the file further comprises, for each of one or more of the subsequent requests:
 assigning a unique identifier to the particular subsequent request;
 mapping of one or more analytics data points to one or more respective data identifiers for the particular subsequent request, wherein the mapping is associated with the unique identifier such that the analytics data values assigned to the data identifiers is associated with the particular request; and
 assigning one or more analytics data values to one or more of the data identifiers, wherein the one or more analytics data values are indicative of at least a portion of the other analytics data.

12. The medium of claim 7, wherein said file comprises webpage code.

13. A system, comprising:
 a content device configured to provide a file, wherein the file defines display information for one or more content items and wherein execution of the file is configured to cause:
  encountering, in the file, a request to transmit analytics data to a remote analytics site;
  delaying transmission of the analytics data to wait for encountering of subsequent requests in the file;
  encountering, in the file, one or more subsequent requests to transmit other analytics data to the remote analytics site;
  aggregating the analytics data and the other analytics data into an analytics request for the remote analytics site; and
  sending the analytics request to the remote analytics site, such that the remote analytics site receives the analytics data and the other analytics via the same analytics request.

14. The system of claim 13, wherein the analytics request is sent to the remote analytics site as an image request.

15. The system of claim 13, wherein said delaying transmission comprises delaying transmission until after receiving an indication that the other analytics data is ready.

16. The system of claim 13, wherein said delaying transmission comprises delaying transmission at least until after a timeout occurs.

17. The system of claim 13, wherein said execution of the file is further configured to cause, for each of one or more of the subsequent requests:
 assigning a unique identifier to the particular subsequent request;
 mapping of one or more analytics data points to one or more respective data identifiers for the particular subsequent request, wherein the mapping is associated with the unique identifier such that the analytics data values assigned to the data identifiers is associated with the particular request; and
 assigning one or more analytics data values to one or more of the data identifiers, wherein the one or more analytics data values are indicative of at least a portion of the other analytics data.

18. The system of claim 13, wherein said file comprises webpage code.

19. The system of claim 13, wherein the content device comprises a web content server.

20. The system of claim 13, wherein the remote analytics site comprises a web server located remote from the content device.

* * * * *